(12) United States Patent
Fermann

(10) Patent No.: US 8,787,410 B2
(45) Date of Patent: Jul. 22, 2014

(54) COMPACT, COHERENT, HIGH BRIGHTNESS LIGHT SOURCES FOR THE MID AND FAR IR

(75) Inventor: Martin Fermann, Dexter, MI (US)

(73) Assignee: Imra America, Inc., Ann Arbor, MI (US)

( * ) Notice: Subject to any disclaimer, the term of this patent is extended or adjusted under 35 U.S.C. 154(b) by 353 days.

(21) Appl. No.: 13/026,762

(22) Filed: Feb. 14, 2011

(65) Prior Publication Data
US 2012/0205352 A1 Aug. 16, 2012

(51) Int. Cl.
*H01S 3/30* (2006.01)
(52) U.S. Cl.
USPC .................................. 372/6; 372/25
(58) Field of Classification Search
USPC .......................................................... 372/6
See application file for complete search history.

(56) References Cited

U.S. PATENT DOCUMENTS

| | | | |
|---|---|---|---|
| 5,400,350 A | 3/1995 | Galvanauskas | |
| 5,488,620 A | 1/1996 | Minden | |
| 5,499,134 A | 3/1996 | Galvanauskas | |
| 5,515,194 A | 5/1996 | Kanterakis et al. | |
| 5,627,848 A | 5/1997 | Fermann | |
| 5,689,519 A | 11/1997 | Fermann | |
| 5,696,782 A | 12/1997 | Harter | |
| 5,701,319 A | 12/1997 | Fermann | |
| 5,818,630 A | 10/1998 | Fermann | |
| 5,880,877 A | 3/1999 | Fermann | |
| 6,034,975 A | 3/2000 | Harter | |
| 6,072,811 A | 6/2000 | Fermann | |
| 6,252,892 B1 | 6/2001 | Jiang | |
| 6,404,964 B1 | 6/2002 | Bhagavatula | |
| 6,873,798 B1 | 3/2005 | Pilipetskii | |
| 6,885,683 B1 | 4/2005 | Fermann | |
| 7,106,762 B1* | 9/2006 | Jiang et al. | 372/6 |
| 7,602,825 B1 | 10/2009 | Lin | |
| 7,782,910 B2 | 8/2010 | Fermann et al. | |
| 2002/0061176 A1* | 5/2002 | Libori et al. | 385/125 |
| 2002/0071453 A1 | 6/2002 | Lin | |

(Continued)

FOREIGN PATENT DOCUMENTS

WO 2010065788 A1 6/2010

OTHER PUBLICATIONS

International Search Report; Written Opinion, (PCT/US2010/021523); dated Jul. 25, 2012.

(Continued)

*Primary Examiner* — Jessica Stultz
*Assistant Examiner* — Michael Carter
(74) *Attorney, Agent, or Firm* — Sughrue Mion, PLLC; Richard C. Turner

(57) ABSTRACT

Compact high brightness light sources for the mid and far IR spectral region, and exemplary applications are disclosed based on passively mode locked Tm fiber comb lasers. In at least one embodiment the coherence of the comb sources is increased in a system utilizing an amplified single-frequency laser to pump the Tm fiber comb laser. The optical bandwidth generated by the passively mode locked Tm fiber comb laser is further decreased by using simultaneous $2^{nd}$ and $3^{rd}$ order dispersion compensation using either appropriate chirped fiber Bragg gratings for dispersion compensation, or fibers with appropriately selected values of $2^{nd}$ and $3^{rd}$ order dispersion. Fibers with large anomalous values of third order dispersion, or fibers with large numerical apertures, for example fibers having air-holes formed in the fiber cladding may be utilized.

19 Claims, 5 Drawing Sheets

(56) References Cited

U.S. PATENT DOCUMENTS

| | | |
|---|---|---|
| 2004/0109655 A1 | 6/2004 | Dennis |
| 2004/0213302 A1* | 10/2004 | Fermann et al. .................. 372/6 |
| 2005/0018714 A1 | 1/2005 | Fermann |
| 2005/0105865 A1* | 5/2005 | Fermann et al. ............. 385/122 |
| 2005/0238070 A1 | 10/2005 | Imeshev et al. |
| 2006/0198398 A1 | 9/2006 | Fermann |
| 2006/0209908 A1* | 9/2006 | Pedersen et al. .................. 372/6 |
| 2007/0086713 A1 | 4/2007 | Ingmar |
| 2008/0043784 A1 | 2/2008 | Wilcox |
| 2009/0268265 A1* | 10/2009 | Shah et al. .................... 358/474 |
| 2010/0225897 A1 | 9/2010 | Fermann |

OTHER PUBLICATIONS

Khanh Kieu, et al., "Femtosecond Laser Pulse Generation with a Fiber Taper Embedded in Carbon Nanotube/Polymer Composite", Optics Letters, Aug. 1, 2007, pp. 2242-2244, vol. 32, No. 15.

R. A. Sims et al., 1 µJ, sub-500 fs chirped pulse amplification in a Tm-doped fiber system, Optics Letters Jan. 15, 2013 vol. 38. No. 2 p. 121-123.

F. Haxsen et al., Pulse energy of 151 nJ from ultrafast thulium-doped chirped-pulse fiber amplifier, Optics Letters Sep. 1, 2010/ vol. 35, No. 17.

F. Haxsen et al., Stretched-pulse operation of a thulium-doped fiber laser, Optics Express 20471 Dec. 8, 2008, vol. 16, No. 25.

* cited by examiner ns in medicine, spectroscopy, ranging, sensing and metrology. Such sources need to be highly robust, have long term stability, and also comprise a minimal component count with a high degree of optical integration for mass market applications. Semiconductor laser based mid IR light sources are very popular. More specifically, quantum cascade lasers have become available that allow a high degree of integration. However, the requirement for cryogenic cooling is generally an obstacle and is not permissible for many applications.

COMPACT, COHERENT, HIGH BRIGHTNESS LIGHT SOURCES FOR THE MID AND FAR IR

FIELD OF THE INVENTION

The invention relates to compact, high brightness, light sources for the mid and far IR spectral region, including fiber-laser based systems, and exemplary applications thereof.

BACKGROUND

High brightness mid-IR light sources have many applications in medicine, spectroscopy, ranging, sensing and metrology. Such sources need to be highly robust, have long term stability, and also comprise a minimal component count with a high degree of optical integration for mass market applications. Semiconductor laser based mid IR light sources are very popular. More specifically, quantum cascade lasers have become available that allow a high degree of integration. However, the requirement for cryogenic cooling is generally an obstacle and is not permissible for many applications.

High degrees of spectral coherence are also particularly important in the construction of frequency combs. Whereas laser sources operating in the near and mid infrared spectral region are readily available, very little work has been done on such frequency comb sources operating in the mid IR wavelength region.

Indeed, mass producible coherent fiber based mid-IR sources or mid-IR comb sources with a high spectral density and operating with a high degree of spectral coherence have not been produced to date.

SUMMARY OF THE INVENTION

Compact coherent mid-IR and far IR frequency comb systems based on passively mode locked Tm fiber comb lasers are described. As used herein, the mid and far IR spectral region includes wavelengths in the range from about 1.7 µm to about a few tens of microns. By way of example, an output of the fiber-based laser system may be in the wavelength range from about 1.8 µm to about 20 µm, a range of great interest for molecular spectroscopy applications.

In order to increase the coherence of the comb sources, an amplified single-frequency laser is used to pump the Tm fiber comb laser. The optical bandwidth generated by the passively mode locked Tm fiber comb laser is further increased by using simultaneous $2^{nd}$ and $3^{rd}$ order dispersion compensation using either appropriate chirped fiber Bragg gratings for dispersion compensation, or fibers with appropriately selected values of $2^{nd}$ and $3^{rd}$ order dispersion. Fibers with large anomalous values of third order dispersion are particularly useful, and can be manufactured from highly Germania doped fibers or fibers with large numerical apertures, for example fibers having air-holes formed in the fiber cladding.

The optical bandwidth of the Tm fiber comb lasers is further increased by using optical ring cavities or Fabry Perot cavities in conjunction with positive dispersion fibers as well as fiber Bragg gratings for dispersion compensation.

The carrier envelope offset frequency of the Tm fiber comb lasers can be controlled using direct modulation of the amplitude of the Tm fiber comb laser pump. Alternatively, electronically addressable optical components can be disposed inside the cavity for carrier phase modulation. An example of such an electronically addressable optical component is an acousto-optic modulator which can modulate the carrier envelope offset frequency via cavity loss modulation. As yet another alternative, external amplitude modulators can be inserted between the Tm fiber comb laser and pump.

The output of the Tm fiber comb laser can further be amplified in a Tm fiber amplifier, where the obtainable pulse energies can be greatly increased using chirped pulse amplification in the Tm fiber amplifiers. The pulse width of the amplified pulses is decreased by the implementation of compensation of $2^{nd}$ and $3^{rd}$ order dispersion. Nonlinear pulse compression can be implemented either directly in the Tm amplifier or in an undoped fiber downstream of the Tm amplifier. Nonlinear pulse compression techniques such as higher order soliton compression or Raman soliton generation can, for example, be implemented. When using pulse compression directly in a Tm amplifier, core pumped Tm amplifiers allow the generation of particularly high pulse energies. In conjunction with Tm amplifiers pulse widths shorter than 50 fs or shorter can be generated. Nonlinear pulse compression techniques are particularly useful for the generation of very short pulses. Because of the relatively high self-focusing threshold at 2000 nm in silica fibers, nonlinear compression techniques can produce short pulses with peak powers >10 MW directly in a silica fiber.

Octave spanning super continuum spectra can be generated by splicing highly nonlinear fibers directly to the output of the Tm fiber amplifier or a pulse compression fiber. The output of the Tm fiber lasers can be further frequency up or down shifted using spectral frequency shifting in nonlinear crystals or waveguides. Alternatively frequency downshifted spectra can be obtained with the use of optical parametric oscillators, optical parametric generators, or amplifiers.

High energy short pulse Tm fiber amplifiers are further useful for micro-machining applications and particularly subsurface machining in semiconductors such as silicon. For such micro-machining applications, high energy pulses can be generated using chirped pulse amplification.

DETAILED DESCRIPTION

Fiber based mid-IR sources producing very short pulses such as femtosecond pulses, or mid-IR sources as obtainable with a mode locked fiber laser are particularly useful for applications in medicine, spectroscopy, ranging, sensing and metrology. Femtosecond pulses have many advantages in mid-IR generation. For example in conjunction with self-frequency shifting in nonlinear crystals frequency tunable outputs in the mid-IR to far IR spectral region can be obtained with femtosecond pulses as recently disclosed in U.S. Patent Application No. 61/426,327, entitled "Compact, high brightness light sources for the mid and far IR", filed Dec. 22, 2010 ('327). In another example, in conjunction with super continuum generation, femtosecond pulses allow more efficient frequency conversion compared to ps or ns pulses, because the peak power of femtosecond pulses is much higher compared to ps or ns pulses for the same pulse energy. Thus mid-IR frequency generation can be performed at high pulse repetition rates. High pulse repetition rates can also maximize the average power or the spectral density of such sources. Another example of the utility of femtosecond pulses generated with mode locked oscillators is their improved spectral coherence when coupling such femtosecond pulses into highly nonlinear fibers, which is an important aspect in frequency metrology applications.

Figure 1:
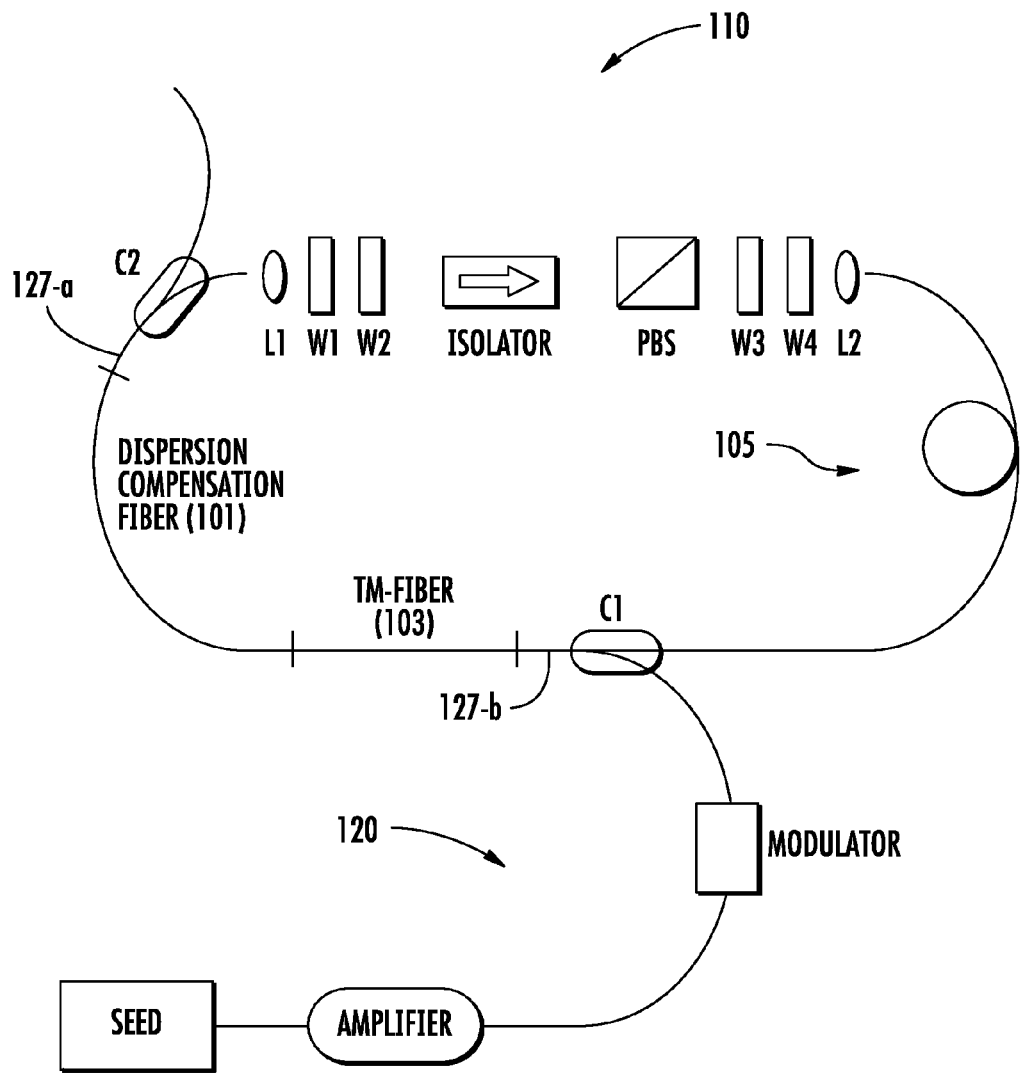
FIG. 1 schematically illustrates a passively mode locked Tm fiber laser optimized for the generation of broad coherent pulse spectra.

Several components of a passively mode locked Tm fiber oscillator optimized for the generation of short pulses and broad coherent spectra are shown in FIG. 1. Tm oscillator cavity 110 is pumped with pump source 120. In this example, pump source 120 comprises a single-mode seed laser such as a low noise single-frequency fiber laser or a single-frequency diode laser operating in the 1500-1650 nm wavelength region in order to overlap with the Tm fiber absorption band in this region. When ultra-low noise is not required an Er fiber laser operating in this wavelength region can also be used as a pump source. The single-frequency fiber seed laser is further amplified in an Er-fiber amplifier and used to pump the Tm fiber laser cavity. The Er-fiber pre-amplifier pump is directed into the Tm fiber laser cavity 110 via an optional amplitude modulator and fiber coupler C1.

Instead of a Tm fiber oscillator, a Tm:Ho fiber oscillator or a Ho fiber oscillator can also be implemented. Appropriate modifications of the pump sources are then also required. For example a Ho fiber can be pumped at 1150 nm with an Yb fiber laser as is well known in the state of the art.

The Tm fiber laser cavity 110 is configured as a uni-directional ring cavity comprising the Tm fiber, coupler C1 for pump coupling and coupler C2 for output coupling. The ring laser is further passively mode locked using nonlinear polarization evolution. Such passively mode locked uni-directional fiber ring cavities were for example described in U.S. Pat. No. 5,515,194 ('194). The cavity further includes collimation lenses L1, L2 and waveplates W1, W2, W3 and W4 configured as quarter wave or half waveplates. The cavity further includes an isolator and a polarization beam splitter PBS. The Tm fiber 103 is spliced on one end to standard single-mode fiber 127-b as for example Corning SMF-28 fiber, as well known in the state of the art. Couplers C1 and C2 are also configured with standard single-mode fiber, which is referred to here as pigtail fiber, and used to couple pump light into the cavity and extract an output therefrom. On the other end the Tm fiber is spliced to a length of dispersion compensation fiber 101 which is connected to coupler C2 with single mode fiber 127-a. The cavity further includes a repetition rate controller 105 in which a fiber coil is made from pigtail fiber wound onto a piezoelectric transducer for repetition rate control. Such elements for repetition rate control are well known.

The laser system of FIG. 1 produces the shortest pulses when the overall cavity dispersion inside the cavity 110 is approximately zero. More generally, in order to generate the shortest possible pulses with the lowest amount of carrier phase noise the $2^{nd}$ order dispersion of the cavity should be close to zero or in a range of +/−20,000 fs$^2$ per meter intra-cavity length. Preferably, such low values of intra-cavity $2^{nd}$ order dispersion are obtained using fibers with different values of $2^{nd}$ and $3^{rd}$ order dispersion. Generally, standard single mode undoped pigtail fiber and the Tm fiber have similar values of $2^{nd}$ and $3^{rd}$ order dispersion, at least the sign of $2^{nd}$ and $3^{rd}$ order dispersion will be the same for Tm fiber oscillators operating at or near a 2000 nm wavelength, for example in a wavelength range from about 1700 to about 2500 nm. One reason is that there are limits to the dopant concentrations that are allowed for glass forming dopants such as $Al_2O_3$ and $P_2O_5$ in silica fibers without inducing devitrification. Because $Al_2O_3$ and/or $P_2O_5$ provide for high solubility of Tm in silica fibers, the numerical aperture of such Tm-doped fibers is typically limited to about 0.25, thus limiting the amount of waveguide dispersion that can be incorporated into such fibers. In contrast, for the rare-earth free dispersion compensating fiber, $GeO_2$ can be used as the main dopant, allowing for much larger values of fiber numerical aperture (up to around 0.40) and large values of waveguide dispersion.

Hence in order to provide very low, nearly minimum intra-cavity dispersion, fibers that compensate for the dispersion of the Tm fiber, or any standard undoped single-mode pigtail fibers, can be utilized in various implementations. These dispersion compensating fibers can be designed with $2^{nd}$ and $3^{rd}$ order dispersion values that have the opposite sign to the corresponding values in the Tm and pigtail fibers. For example, a plurality of fiber sections may be utilized, each section having at least one length of fiber, wherein:

a first fiber section has a positive dispersion value, $D2_1$;

a second fiber section has a negative dispersion value, $D2_2$;

the first fiber section has a negative third order dispersion value, $D3_1$; and the second fiber section has a positive third order dispersion value, $D3_2$.

Also, a particular fiber section need not include the same number of fibers as another section to produce net (or average) positive or negative dispersion values, as indicated above.

In addition, ideally, the ratios of $2^{nd}$ and $3^{rd}$ order dispersion should satisfy the following relation:

$$(D2_1/D3_1)/(D2_2/D3_2) \sim 1,$$

where $D2_1$, $D3_1$, $D2_2$, $D3_2$ are the values of second and third order dispersion in the Tm fiber and the dispersion compensating fiber, respectively. In some preferred embodiments the ratios of the $2^{nd}$ and $3^{rd}$ order dispersion further approximately satisfy:

Preferably:

$$0.2 < (D2_1/D3_1)/(D2_2/D3_2) < 5.$$

More preferably:

$$0.5 < (D2_1/D3_1)/(D2_2/D3_2) < 2.$$

Most preferably:

$$0.7 < (D2_1/D3_1)/(D2_2/D3_2) < 1.3.$$

As mentioned above, in order to generate the shortest pulses with minimal carrier phase noise the overall value of second order dispersion should be in a range of about +/−20,000 fs$^2$ per meter intra-cavity fiber length. Generally, a fiber cavity may comprise more than two different fiber designs. In such implementations it is sufficient to lump fibers with positive dispersion and fibers with negative dispersion into two different fiber sections with average values of $2^{nd}$ and $3^{rd}$ order dispersion.

Figure 2:
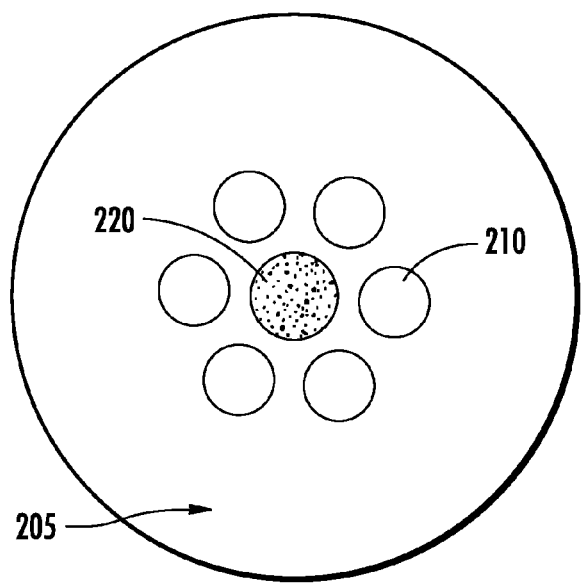
FIG. 2 schematically illustrates a cross section of a Tm doped photonic crystal fiber with positive $2^{nd}$ order dispersion and negative $3^{rd}$ order dispersion.

Another alternative for obtaining fibers with opposite signs of $2^{nd}$ order dispersion, but similar $2^{nd}/3^{rd}$ dispersion ratios, can be accomplished with the implementation of photonic crystal fibers. For example, Tm doped photonic crystal fibers can be manufactured with positive dispersion by the addition of small air-holes surrounding the central doped fiber section as shown in FIG. 2 and appropriate control of the core diameter. A fiber with a Tm doped core 220 surrounded by six air-holes 210 embedded in a larger silica fiber cladding 205 is shown. Negative values of third order dispersion can thus also be obtained. Alternatively, undoped photonic crystal fibers can be manufactured which similarly allows for a control of $2^{nd}$ and $3^{rd}$ order dispersion. Such undoped photonic crystal fibers can be based on silica glass material.

When the ratios of $2^{nd}$ to $3^{rd}$ order dispersion are closely matched and the active dispersion of the cavity is set approximately to zero (by selecting appropriate fiber lengths) the generated pulses are essentially bandwidth limited somewhere inside the cavity. Positively chirped pulses are generated at the output of coupler C2, assuming that the dispersion of the pigtail fiber of coupler C2 is very much smaller than the dispersion of the intra-cavity dispersion compensating fiber 101. Near bandwidth limited pulses are then obtained by appropriate selection of the pig-tail fiber lengths at the output of coupler C2. Here the coupler pigtail fibers of coupler C2 are preferably selected to have similar value of $2^{nd}$ and $3^{rd}$ order dispersion as the intra-cavity Tm doped fiber 103. Moreover, in contrast to the '194 patent, the laser system can be operated as essentially a soliton laser with minimal intra-cavity pulse width changes by adjusting the overall active cavity dispersion to be slightly negative while still producing very short pulses.

The laser system can also be operated as a similariton laser as, for example, discussed in U.S. Pat. No. 7,782,910 and can produce approximately parabolic pulses when operating the laser with overall positive cavity dispersion. Parabolic pulse formation is facilitated, because the Tm fiber and the fiber pigtails can have a much larger core area than the dispersion compensating fiber and thus pulse shaping is dominated by the dispersion compensating fiber resulting in parabolic pulse formation. More generally, this allows for parabolic pulse formation in fiber laser cavities using negative dispersion gain fiber rather than positive dispersion gain fiber, in contradistinction to conventional parabolic pulse generation techniques.

Apart from operation with large optical bandwidths and minimum amount of carrier phase noise, another advantage of operation near the zero dispersion point is that near bandwidth limited pulses can be easily obtained at the output pigtail of coupler C2. A reason is, that for a certain fiber pig-tail length, both $2^{nd}$ and $3^{rd}$ order dispersion of the output pulses are automatically compensated, as discussed above. Simultaneous $2^{nd}$ and $3^{rd}$ order dispersion compensation is difficult in external fiber pigtails connected to passively mode locked oscillators unless complex and expensive pulse shaping elements are used.

In the example of FIG. 1 a mode locked fiber comb ring laser using nonlinear polarization evolution for modelocking was shown. However, when modelocking is utilized for generation of pulses with pulse widths <150 fs or spectral bandwidths >60 nm, similar considerations for the selection of values of $2^{nd}$ and $3^{rd}$ order dispersion of the intra-cavity fibers apply. Notably, the considerations also apply when using any modelocking technique. For example, ring laser architectures with reduced polarization sensitivity can be constructed with the additional use of a graphene or carbon-nano-tube saturable absorber anywhere in the cavity. Such saturable absorbers can for example also be incorporated via evanescent field coupling in a fiber taper as well known in the state of the art and for example discussed in K. Kieu and M. Mansuripur, 'Femtosecond laser pulse generation with a fiber taper embedded in carbon nanotube/polymer composite', Opt. Lett., 32, 2242-2244 (2007).

Additional Tm amplifiers (not shown) can further be spliced onto the output of coupler C2. The $2^{nd}$ and $3^{rd}$ order dispersion values of the Tm amplifiers can be compensated with appropriate lengths of dispersion compensating fiber inserted in front of the amplifiers. With optimum selection of fibers, and also using nonlinear compression inside the Tm amplifiers, pulses shorter than 50 fs, and as short as 10-30 fs, at pulse energies of many tens of nJ can be generated with such systems.

Figure 3:
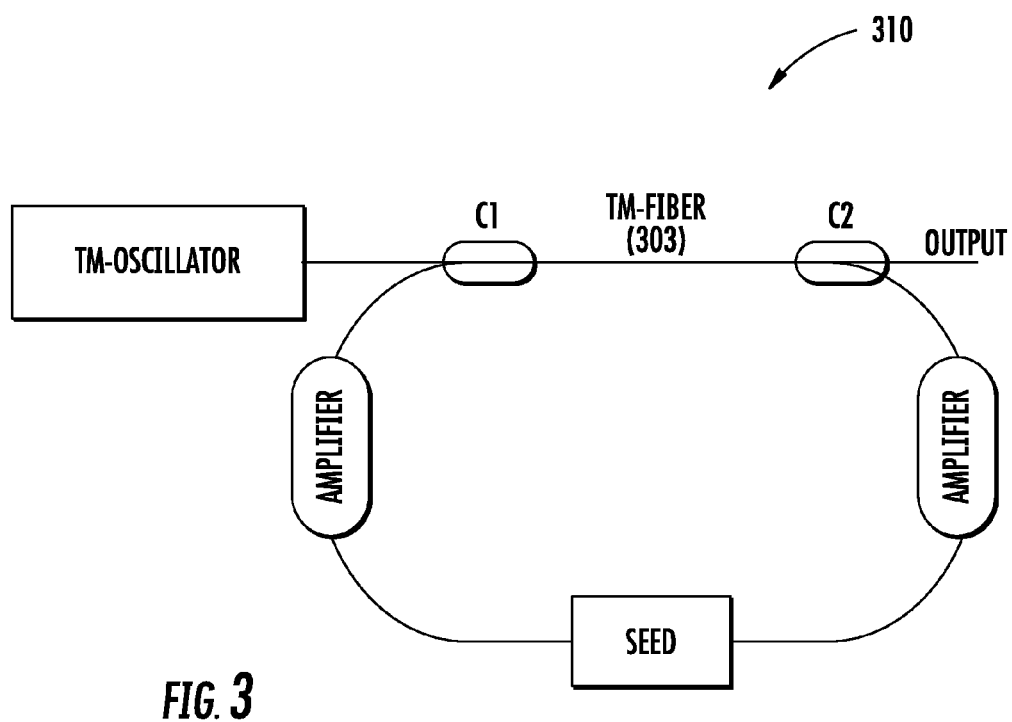
FIG. 3 schematically illustrates a mode locked Tm fiber laser in conjunction with a core-pumped Tm amplifier.

A system configuration with an additional core pumped Tm amplifier 310 is shown in FIG. 3. Here the Tm oscillator output is injected into a Tm amplifier fiber 303 via wavelength division multiplexing coupler C1. Coupler C1 also directs pump light into the Tm amplifier fiber. An additional dispersion compensating fiber may also be included upstream of coupler C1 and is not separately shown. This dispersion compensating fiber ideally compensates for $2^{nd}$ and $3^{rd}$ order dispersion of the Tm amplifier and any residual pulse chirp obtained at the output of the oscillator, thereby ensuring the generation of short pulses at the output of either the Tm amplifer or the output of the optional coupler C2. As discussed with respect to FIG. 1, the pump light is obtained from an erbium amplifier seeded with a diode or alternatively a fiber laser in the 1500-1650 nm wavelength region. Cladding pumped erbium amplifiers can be conveniently used. The Tm amplifier output is then obtained at either the end of the Tm amplifier or at optional coupler C2. To enable core pumping from both ends of the Tm amplifier, C2 can also be configured as a wavelength division multiplexing coupler. Nonlinear pulse compression or higher-order soliton compression in the Tm amplifier or the pigtail of coupler C2 can further be used to obtain very short pulses in a very compact configuration. Also large mode area fibers can be used downstream of coupler C2 to further increase the possible pulse energies. In other implementations, coupler C1 can be omitted and only coupler C2 can be used for pumping the Tm amplifier.

At the location of the amplifier output where the shortest pulses are obtained, a highly nonlinear silica fiber can be spliced on, which allows for broadband coherent super continuum and frequency comb generation. The carrier phase can be measured with an f-2f interferometer inserted after the output of the highly nonlinear fiber (not shown). The carrier phase measurement technique is well known, and disclosed in U.S. Pat. No. 7,649,915 ('915), entitled "Pulsed laser sources", which is hereby incorporated by reference in its entirety. For example, FIGS. 8-13 and associated text of the '915 patent disclose oscillator phase control implementations and highly integrated frequency comb sources configured with highly nonlinear fibers.

In order to simplify the assembly of the whole system, preferably all Tm amplifiers and highly nonlinear fibers are based on silica, allowing fiber connections via fused fiber splices. An appropriate highly nonlinear fiber is a fiber designed to provide around zero dispersion or slightly negative dispersion at the emission wavelength of the Tm fiber system. The benefit of a Tm fiber based super continuum source based on silica fiber components can be obtained not only from mode locked Tm fiber oscillators producing very short pulses as described with respect to FIG. 1, but with any Tm fiber system. For example, super continuum generation can also be obtained using mode locked Tm fiber oscillators producing much longer pulses, in the range of 20 fs-50 ps, or Tm oscillators producing pulses with ns pulse widths. The use of silica Tm fiber amplifiers and highly nonlinear silica fibers in such systems is advantageous as it simplifies system construction.

As an alternative to highly nonlinear silica fibers, non silica highly nonlinear fibers can be used such as chalcogenide or telluride fibers. However, such fibers can be more difficult to handle and cannot always be spliced to a silica fiber. Due to the high nonlinearity of such more exotic fiber materials, coherent octave spanning super continuum spectra can also be generated using only the output of a Tm oscillator without need for a Tm fiber amplifier.

Referring again to FIG. 3, for frequency comb generation the carrier phase of the Tm fiber laser can be modulated by, for example, modulating the operation current for the oscillator diode seed laser or by modulating the oscillator pump power generated with the Er amplifier directed to the oscillator. Alternatively the amplitude modulator as shown in FIG. 1 can be inserted in front of oscillator coupler C1 for carrier phase modulation. Other alternatives are also well known in the state of the art. For example, in U.S. Pat. No. 7,649,915 ('915) it was disclosed that components can be incorporated into the optical path inside a cavity for carrier phase control, where these components are preferably electronically addressable. An example of an intra-cavity component allowing for particularly rapid intra-cavity carrier phase modulation was discussed with respect to FIG. 6c of U.S. patent application Ser. No. 12/399,435, entitled "Optical scanning systems based on dual pulsed laser systems", filed Mar. 6, 2009, to Fermann et al., where an acousto-optic modulator is implemented for intra-cavity loss and carrier phase modulation. The contents of U.S. patent application Ser. No. 12/399,435 are hereby incorporated by reference in their entirety.

As yet another alternative, the output of the Tm fiber laser can be delivered to an acousto-optic frequency shifter to stabilize the carrier phase of the system without oscillator power control. Such schemes are well known in the state of the art and need no further explanation. The various methods for carrier phase control as discussed here can be applied not only to fiber oscillators as described with respect to FIG. 1, but to any mode locked fiber oscillators, i.e. acousto-optics modulators can be used for carrier phase control with Tm fiber oscillators producing pulses in the range from 20 fs-50 ps or mode locked oscillators based on any other rare-earth dopant.

Figure 4:
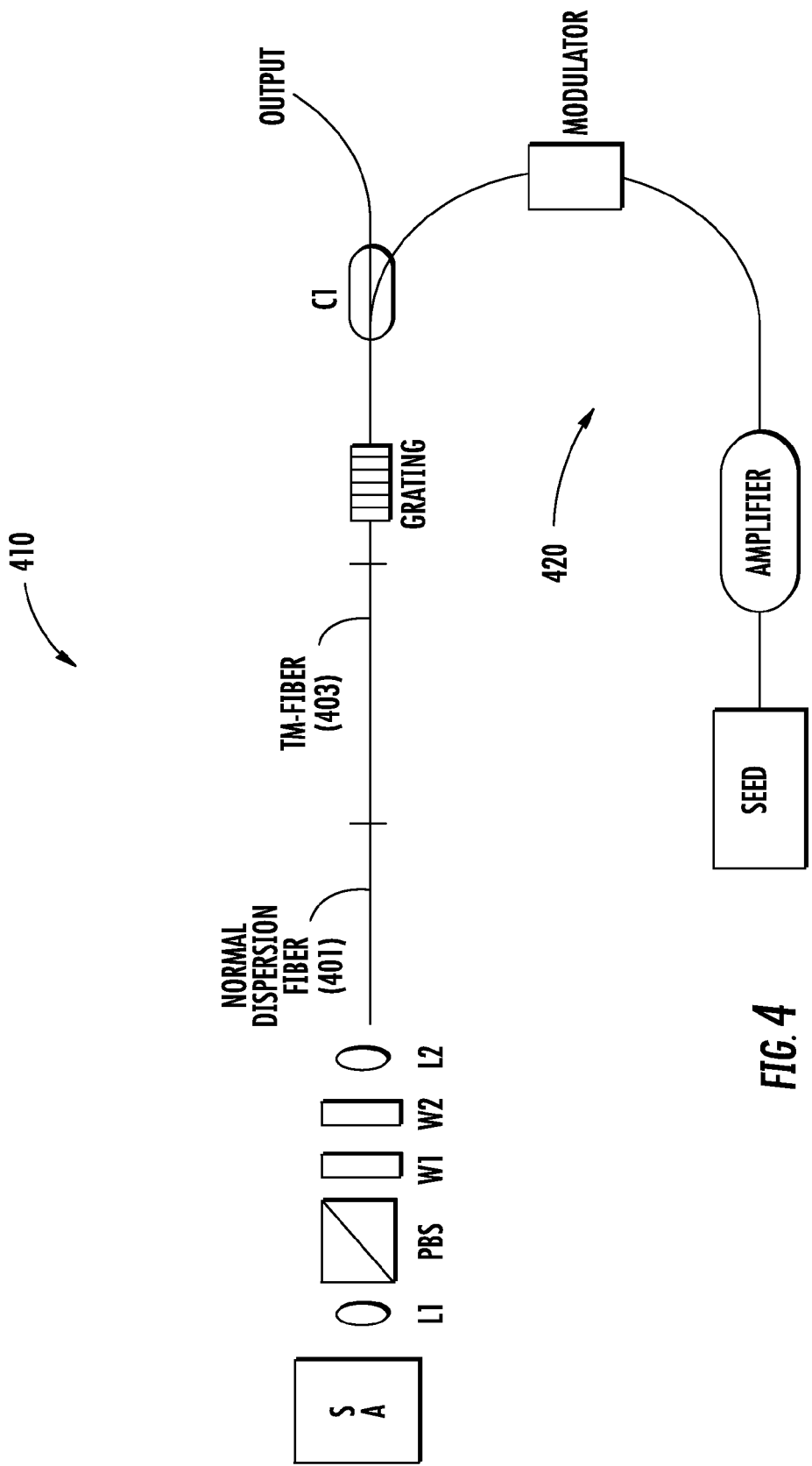
FIG. 4 schematically illustrates an alternative embodiment of a passively mode locked Tm fiber laser optimized for the generation of broad coherent pulse spectra.

An alternative implementation for a passively mode locked Tm fiber oscillator using a Fabry-Perot cavity 410 instead of a ring cavity is shown in FIG. 4. The oscillator also contains a fiber Bragg grating for additional dispersion control as well as a saturable absorber (SA) to initiate mode locked operation. The SA can be based for example on an InAs/AlSb multiple quantum well grown on a GaSb substrate, however, other saturable absorbers such as graphene or carbon nanotube based absorbers as well known in the state of the art can also be implemented. The oscillator cavity design is very similar to the ring design 110. The Tm oscillator pump 420 includes a seed laser amplified with an Er amplifier and the pump light is directed via an optional modulator and wavelength division multiplexing coupler C1 to the fiber laser cavity bounded by the fiber Bragg grating and the SA. The cavity further comprises a Tm silica fiber 403 and a normal dispersion fiber 401 with normal dispersion near 2000 nm. Waveplates W1 and W2 and the polarization beam splitter PBS are used for polarization control. Lenses L1 and L2 are used to control the spot size on the saturable absorber. Components for polarization manipulation can be eliminated by using all polarization maintaining components throughout the cavity.

In order to generate the shortest pulses or the broadest pulse spectra, it is advantageous to provide most of the cavity dispersion or nonlinearity via the highly dispersive fiber. The absolute value of the second order dispersion of the highly dispersive fiber should be at least about 1.5 times larger than the absolute value of the second order dispersion of the Tm fiber. Alternatively, the length of the normal dispersion fiber should be at least around 1.5 times longer than the length of the Tm fiber. The fiber grating then compensates for the residual value of $2^{nd}$ and $3^{rd}$ order dispersion within the cavity. As with the ring laser design discussed with respect to FIG. 1, parabolic or similariton pulses can be generated with overall positive cavity dispersion and a negative dispersion Tm fiber amplifier. The broadest pulse spectra are obtained by operating the oscillator with slightly positive values of overall cavity dispersion, or generally when providing a cavity dispersion in the range of ±20,000 fs$^2$ per m intra-cavity fiber length. For broad bandwidth generation, the normal dispersion fiber can also be included adjacent to the fiber grating, which further allows writing of the fiber grating directly into the normal dispersion fiber.

Although FIG. 4 shows a fiber oscillator using Tm doped fiber, other rare-earth dopants can also be used in conjunction with such a cavity design and parabolic pulse generation as discussed above. For example, instead of Tm fiber, negative dispersion Er doped fiber can also be implemented in conjunction with a normal dispersion fiber and a negative dispersion fiber grating. Further, $3^{rd}$ order dispersion compensation facilitated with the fiber grating can also be used. Parabolic pulse generation can also be induced when using positive dispersion Tm fiber as described with respect to FIG. 2 in conjunction with negative dispersion compensation fiber or negative dispersion chirped fiber Bragg gratings. Such schemes resemble parabolic pulse generation using positive dispersion Er or Yb oscillators, e.g. as discussed in U.S. Pat. No. 7,782,910, entitled "Single-polarization high power fiber lasers and amplifiers" to Fermann et al.

Figure 5:
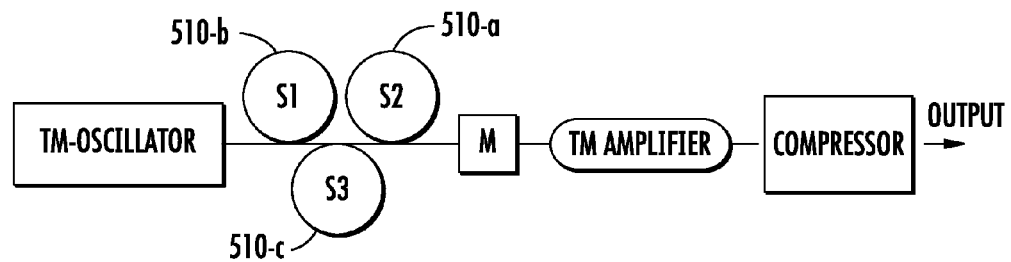
FIG. 5 schematically illustrates a passively mode locked Tm fiber oscillator and a Tm fiber amplifier.

For some applications it is beneficial to increase the pulse energy from Tm fiber amplifiers beyond the limits set by nonlinear compression. For such applications chirped pulse amplification, as well known in the state of the art, can be implemented. FIG. 5 illustrates a fiber-based chirped pulse amplification system (FCPA), including a Tm fiber amplifier. The system, which will be further discussed below, includes a Tm oscillator, stretcher configuration, Tm amplifier, and pulse compressor. Tm fiber based chirped pulse amplification systems were also discussed in U.S. patent application Ser. No. 11/091,015 ('015), entitled "Optical parametric amplification, optical parametric generation, and optical pumping in optical fibers systems", filed Mar. 25, 2005 to Imeshev et al., which is hereby incorporated by reference in its entirety. The implementation of chirped pulse amplification has the additional advantage that very high average powers can be obtained, in the range of about 1-100 W and even higher. Such high power levels can be reached with both core and cladding pumped configurations.

Conveniently a stretcher fiber with positive values of $2^{nd}$ order dispersion and anomalous third order dispersion can be used for pulse stretching in such a chirped pulse amplification system. Also such stretcher fibers can be combined with fibers that allow for higher order mode propagation, producing small values of negative $2^{nd}$ order dispersion as well as anomalous third order dispersion. The combination of such stretcher fibers can further increase the $3^{rd}/2^{nd}$ order dispersion ratio of the stretcher arrangement. A relatively large value of $3^{rd}/2^{nd}$ order dispersion is required in the stretcher configuration to compensate for the $3^{rd}$ order dispersion of subsequent pulse compressors, particularly when using pulse compressors based on glass plates or bulk grating pairs, as discussed in '015. The use of the stretcher fiber configurations with anomalous third order dispersion allows for a compensation of the third order dispersion of the glass plate. For example, when using a fused silica glass plate at a wavelength of 1950 nm, the ratio R of $3^{rd}/2^{nd}$ order dispersion is R≈8.1× $10^{-40}/9×10^{-26}$ s≈9 fs.

When using bulk compressor arrangements, grisms can further be implemented for compensation of higher order dispersion in the stretcher and compressor arrangement. Such grism compressors were recently discussed by C. G. Durfee et al., 'A modular approach to the analytic calculation of spectral phase for grisms and other refractive/diffractive structures', Opt. Express, Vol. 17, pp. 18004 (2008). These grisms can use prisms based on silicon as a highly dispersive material. Alternatively, silicon prism pairs can also be used for efficient pulse compression allowing for second and third order dispersion compensation with appropriately selected stretcher fibers.

The attenuation of highly dispersive silica fibers in the 1950 nm wavelength range can vary from about 4 dB/km to 8 dB/km, and up to about 16 dB/km, at wavelengths of 1900 nm, 1950 nm and 2000 nm. Hence, up to 1000 m of stretcher fiber can be used in stretcher fiber configurations. Such stretcher fibers can have a dispersion of around 100 $ps^2$. Hence, as is easily shown, stretched pulse durations of about 1 ns using bandwidth limited 500 fs pulses at 1950 nm can be obtained. Such 1 ns stretched pulses can be amplified to pulse energies of around 50 µJ in 4 m long cladding pumped 50 µm core diameter Tm fibers, assuming a slightly nonlinear amplifier. Even higher pulse energies can be obtained with shorter amplifier lengths or larger core diameters. For example shorter amplifier lengths are possible with the use of core-pumping.

A generic Tm fiber based chirped pulse amplification system is shown in FIG. 5. Here a mode locked Tm oscillator output is stretched using up to three or more several different stretcher fibers 510-a, 510-b, and 510-c (S1, S2 and S3). The overall dispersion generated by these stretcher fibers is selected to be positive. Most generally these stretcher fibers are further selected with different values of $2^{nd}$, $3^{rd}$ and $4^{th}$ order dispersion to allow compensation of $2^{nd}$ $3^{rd}$ and $4^{th}$ order dispersion in the compressor. Photonic crystal fibers, fibers with high Germania concentration and fibers allowing for higher order mode propagation, as well known in the state of the art, can be used for pulse stretching. Alternatively chirped fiber Bragg gratings can also be used for pulse stretching. At least one optional modulator, for example an AO or EO modulator in bulk or integrated form, can be inserted to reduce the repetition rate of the pulses before injection into a Tm fiber power amplifier. The Tm power amplifier can be core or cladding pumped. Additional Tm-amplifiers can also be used and are not separately shown here. For pulse compression, bulk grating pairs, glass plates, prism pairs as well as grism pairs can be implemented.

Such Tm fiber chirped pulse amplification systems are useful as they preserve nearly maximum coherence in the amplification process, particularly when the B-integral in the amplifier system is kept smaller than π, a criteria corresponding to an amplification system designed to be linear. In particular, linear chirped pulse amplification systems can be implemented with cladding pumped Tm fiber amplifiers without the introduction of significant phase or amplitude noise. Hence such Tm fiber chirped pulse amplification systems can be implemented in frequency comb applications such as spectroscopy and ranging, which require a high degree of coherence of the individual comb lines. Also the low phase noise induced by linear chirped pulse amplification systems is useful when pumping subsequent parametric oscillators for further wavelength extension.

Figure 6:
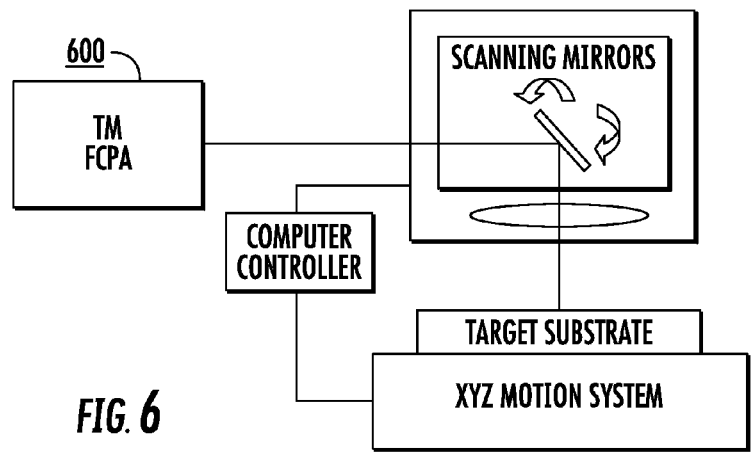
FIG. 6 schematically illustrates an exemplary material processing apparatus based on a Tm FCPA system.

In embodiments in which ultra-low levels of phase noise are not required, further nonlinear pulse compression stages can be implemented downstream of a chirped pulse amplification system. In some embodiments the compressor shown in FIG. 5 may include a linear bulk compressor elements as discussed above, and fiber(s) for non-linear compression. For example, the output of the amplifier system can be coupled into a large core fiber with a core diameter between 25-100 µm (even larger core diameters are possible), allowing for nonlinear pulse compression and the generation of peak powers only limited by the self-focusing limit of silica glass in the 2000 nm wavelength range, which is higher than 15 MW. Nonlinear pulse compression is particularly useful for the generation of pulses with a pulse width <100 fs. For example, a 100 fs pulse with a peak power of 15 MW has a pulse energy of 1.5 µJ which is of interest for many applications in micro-machining Another application area for Tm fiber chirped pulse amplification systems are micro-machining applications such as machining of materials such as silicon. Here the use of 2000 nm wavelength light is advantageous because it is well below the bandgap of silicon and many other materials, allowing the exploitation of multi-photon excitation of the material for machining. Multi-photon excitation is particularly useful in conjunction with sub-surface machining, as optical breakdown can be easily induced below the surface of the to be machined material(s), generating a minimum of debris at the surface of the material in the machining process. FIG. 6. schematically illustrates an exemplary material processing apparatus based on a Tm FCPA system 600. For micro-machining with short pulse, Tm fiber systems the use of sub-picosecond pulses are not always required. Generally, high energy pulses with pulse widths <100 ps can be implemented as they limit thermal coupling to the surrounding materials and thus minimize collateral damage to the to be machined material. Such considerations are well known from short pulse micro-machining systems operating at other wavelengths, (e.g.: 800 nm and 1050 nm) and are not further discussed here.

Figure 7:
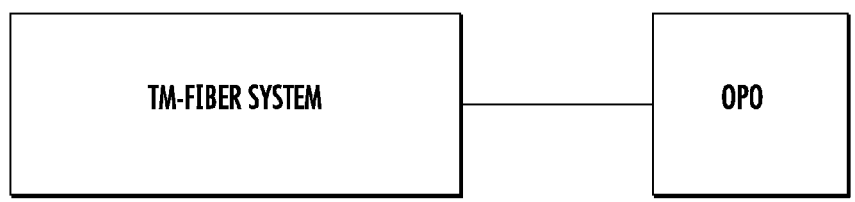
FIG. 7 schematically illustrates a Tm fiber laser system pumping an optical parametric oscillator.
Figure 8:
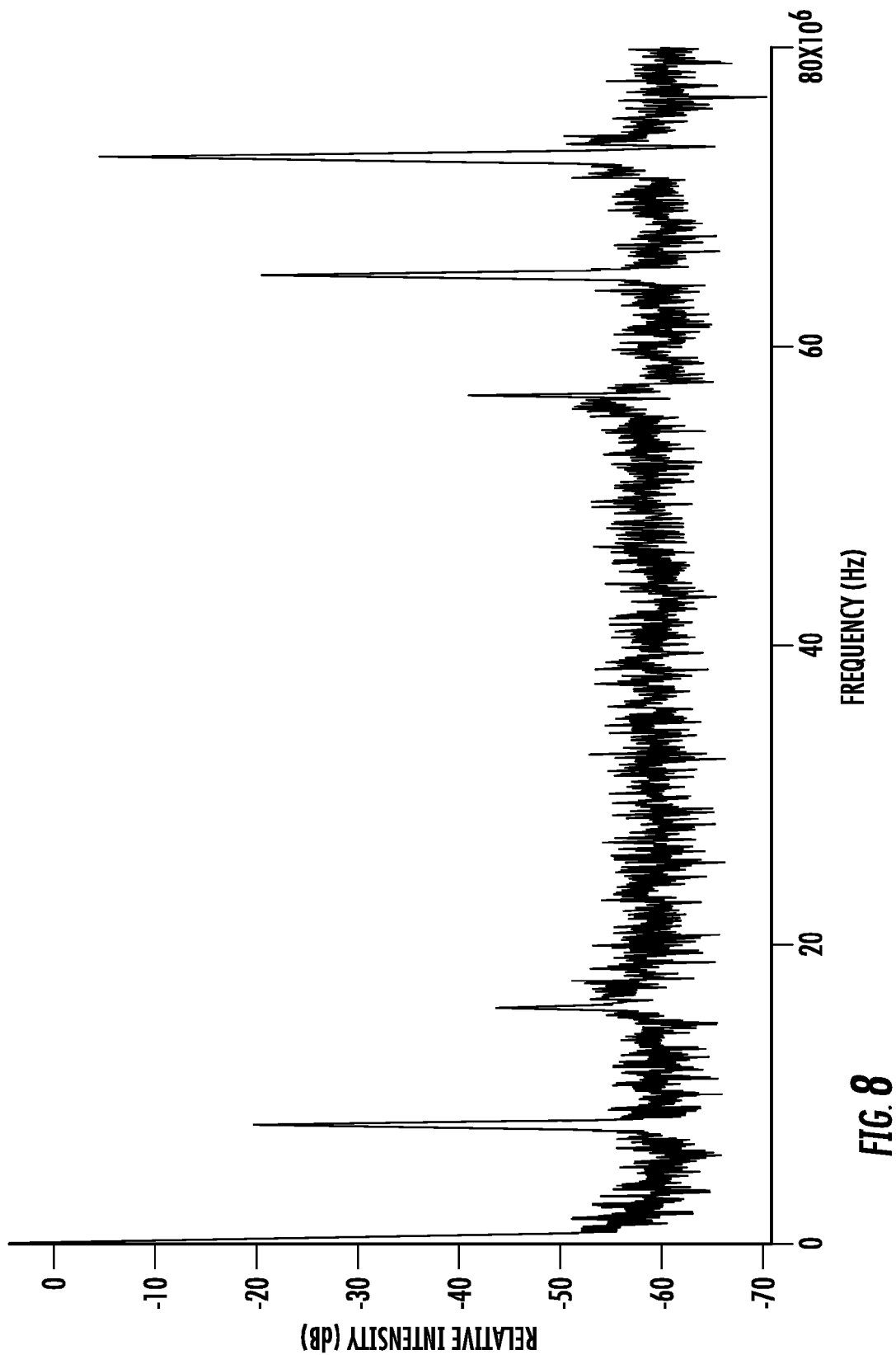
FIG. 8 is a plot of the RF spectrum obtained from a low noise Tm fiber comb laser, using an f-2f interferometer.

A Tm fiber system pumping an optical parametric oscillator (OPO) is further illustrated in FIG. 7. Here the fiber system can comprise a Tm fiber based chirped pulse amplification system as discussed with respect to FIG. 5. However, a Tm fiber based Raman soliton amplifier as disclosed in U.S. patent application Ser. No. 11/091,015 to Imeshev et al. can also be implemented. The OPO can comprise a nonlinear crystal or waveguide. Appropriate nonlinear crystals for the OPO can for example comprise periodically poled $LiNbO_3$. GaP, OPGaAs, OPGaP or $ZnGeP_2$. However, many other nonlinear crystals can also be used. Other examples comprise GaSe, $AgGaSe_2$, $AgGaS_2$ or $CdGeAs_2$. The OPOs can be designed to be singly resonant or doubly resonant; such OPO configurations are well known in the state of the art. Because of the low noise obtainable with linear chirped pulse amplification system, for the lowest noise OPO operation, an OPO pump source based on a Tm fiber chirped pulse amplification systems with a B-integral smaller than π is preferred. Further noise reduction and system miniaturization can be obtained when using only a Tm fiber oscillator for OPO pumping, where the Tm oscillator is optimized for high power operation by for example using operation with parabolic pulses.

Instead of an OPO, self frequency shifting in appropriate nonlinear crystals can also be used for frequency down conversion. Appropriate crystal designs allowing for frequency down conversion were discussed in the '327 Application and are not further described here. In conjunction with linear chirped pulse amplification systems, particularly low noise performance can also be obtained with self-frequency shifting.

Another alternative for frequency shifting is the use of an optical parametric generator (OPG) or amplifier (OPA) as also discussed in the '015 Application. In conjunction with a nonlinear crystal based on OPGaAs, OPG, or OPA thresholds <100 nJ can be obtained, making such wavelength shifting options compatible with high repetition rate laser operation. For example, at a repetition rate of 40 MHz, a pulse energy of 100 nJ corresponds to an average power of only 4 W, which is easily obtainable from cladding pumped Tm fiber amplifiers. A Tm fiber based OPA can, for example, utilize a Tm fiber chirped pulse amplification system. One part of the Tm fiber system output is utilized for super continuum generation in a continuum fiber, comprising highly nonlinear fiber, for signal generation. The second part of the Tm system output is used as a pump for parametric amplification of the super continuum output in an OPGaAs crystal. Appropriate dispersion compensation stages can also be implemented. For example, FIG. 4 and FIGS. 14-15 and associated text of the '015 Application illustrate exemplary OPA configurations utilizing highly nonlinear continuum fibers. In various embodiments of the present invention nonlinear crystals may also be implemented. Also, other schemes for super continuum generation based on highly nonlinear waveguides, for example periodically poled waveguides (e.g.: PPLN) or sapphire plates, may also be implemented. Similar schemes were already discussed in '015 and are not further described here.

Many variations of the above arrangements are possible. For example, a fiber-laser based amplification system may include a passively mode locked fiber oscillator operating at or near a wavelength of 2000 nm, with a pulse stretcher downstream that provides anomalous third order dispersion. A fiber amplifier amplifies the stretched pulses so as to produce stretched and amplified pulses at an output thereof. In some implementations the amplifier may be nonlinear and provide a value of self-phase modulation of at least 2. In some embodiments the spectrum at the output of an amplifier is broadened due to the self-phase modulation. Pulses at the output of an amplifier can also be nonlinearly compressed as a result of self-phase modulation. In some configurations a highly nonlinear fiber may be directly spliced to an output of an amplifier. Undoped fiber may be directly spliced to the output of said amplifier in some configurations and provide additional pulse compression. The fiber-based oscillator and amplifier system provide for supercontinuum generation in the mid-far IR range in a highly integrated system.

A system demonstration of a Tm fiber comb system was performed as follows. A Tm fiber oscillator as described with respect to FIG. 1 was implemented with a 30 cm length of Tm amplifier fiber, core pumped with up to 1 W of pump power at 1563 nm. The pump was generated with a single-frequency diode seed laser amplified in a cladding pumped Er-amplifier pumped with up to 10 W at 980 nm. An additional undoped 1 m long pigtail of conventional step index fibers (Corning SMF-28) and 1.2 m of dispersion compensating fiber with normal $2^{nd}$ order and anomalous third order dispersion were included in the cavity for dispersion compensation. The cavity operated at 75 MHz and generated an output power of 10 mW at a center wavelength of 1940 nm when operated with slightly negative values of overall cavity dispersion. The generated pulse spectral width was 50 nm, corresponding to bandwidth limited pulses with a pulse width of around 100 fs.

For amplification of the oscillator output and super continuum generation we used an optical configuration as described with respect to FIG. 3, where coupler C2 was omitted and a 30 cm length of highly nonlinear fiber was directly spliced to the Tm amplifier, which had a length of about 50 cm. The Tm amplifier was pumped with up to 3 W at a wavelength of 1563 nm. The pump was generated with a single-frequency diode seed laser amplified in a cladding pumped Er-amplifier pumped with around 10 W at 980 nm. A short section of dispersion compensating fiber with normal $2^{nd}$ order and anomalous $3^{rd}$ order dispersion was further inserted upstream up coupler C1 to ensure the generation of near bandwidth limited pulses at the output of the Tm amplifier. The Tm amplifier generated pulses with a pulse width of around 70 fs and an average power of 300 mW at its output, and was operated at moderate values of self-phase modulation (SPM<$3\pi$) in order to enable nonlinear pulse compression in the Tm fiber amplifier.

An octave spanning spectrum was observed at the output of the highly nonlinear fiber. A low noise f-2f beat was observed in the RF domain using a spectral filter at 1060 nm and an f-2f interferometer configured for doubling the output of the highly nonlinear fiber at 2120 nm. The RF spectrum measured with the f-2 f interferometer is further shown in FIG. 8; the beat frequencies due to the f-2f beat are observed at 8 and 68 MHz. A S/N ratio between the f-2f beat and the noise background of around 40 dB is observed. The output of the f-2f interferometer can thus be used for carrier phase stabilization of the oscillator using the techniques described above. Additional means for repetition control as well known in the state of the art can further be incorporated into the Tm oscillator to precisely control the Tm fiber comb.

Thus, the invention has been described in several embodiments.

At least one embodiment includes a fiber-laser based system. The system includes a passively mode locked fiber oscillator operating at or near a wavelength of 2000 nm, the oscillator including a plurality of fiber sections. Each section has at least one length of fiber, wherein:

a first fiber section has a positive dispersion value, $D2_1$,
a second fiber section has a negative dispersion value, $D2_2$,
the first fiber section has a negative third order dispersion value, $D3_1$,
the second fiber section has a positive third order dispersion value, $D3_2$, and the dispersion values approximately satisfy the relation:

$$0.2<(D2_1/D3_1)/(D2_2/D3_2)<5.$$

The dispersion values provide overall cavity dispersion in a range of about ±20,000 fs$^2$ per meter intra-cavity fiber length. The system also includes a pump source to pump the passively mode locked fiber oscillator.

At least one embodiment includes fiber-laser based system. The system includes a passively mode locked fiber oscillator having a gain fiber with a negative dispersion value $D2_1$. At least one fiber section has a positive dispersion value $D2_2$. The absolute value of $D2_1$ is at least 1.5 times larger than the absolute value of $D2_2$. The system further includes a chirped fiber grating to compensate for the residual dispersion value of the oscillator, such that the overall cavity dispersion is in a range of about ±20,000 fs$^2$ per meter cavity fiber length. A pump source pumps the passively mode locked fiber oscillator.

In some embodiments dispersion values may approximately satisfy the relation: $0.5<(D2_1/D3_1)/(D2_2/D3_2)<2$.

In some embodiments dispersion values may approximately satisfy the relation: $0.7<(D2_1/D3_1)/(D2_2/D3_2)<1.3$.

In some embodiments a passively mode locked fiber oscillator may operate in the wavelength range from about 1700 nm to 2500 nm.

In some embodiments a passively mode locked fiber oscillator may include a Tm, a Tm:Ho, or a Ho doped fiber.

In some embodiments a fiber-based laser system may include a continuum fiber for super continuum generation.

In some embodiments a fiber-based laser system may include a fiber amplifier inserted between an oscillator and a continuum fiber.

In some embodiments a fiber-laser based system may include an undoped fiber inserted between the amplifier and the continuum fiber, where the undoped fiber does not produce substantial gain.

In some embodiments an undoped fiber may provide for higher order soliton compression, nonlinear compression or Raman soliton generation.

In some embodiments a fiber-laser based system may include a highly nonlinear silica fiber spliced directly to the output of the undoped fiber.

In some embodiments a fiber amplifier may be capable of higher order soliton compression, nonlinear compression, Raman soliton generation or chirped pulse amplification.

In some embodiments a fiber amplifier may be core pumped or cladding pumped.

In some embodiments a fiber amplifier may be core pumped with an Er fiber amplifier.

In some embodiments a fiber-laser based system may include a highly nonlinear silica fiber spliced directly to an output of an oscillator.

In some embodiments a fiber-laser based system may include a highly nonlinear silica fiber spliced directly to an output of a fiber amplifier.

In some embodiments an oscillator may be core pumped, and the pump source may include: a single-frequency laser; and an Er fiber amplifier amplifying an output of a single-frequency laser.

In some embodiments a fiber-laser based system may include a modulator to vary an output power of the pump source in such a way as to control a carrier envelope offset frequency within an oscillator.

In some embodiments an oscillator may include a saturable absorber.

In some embodiments an oscillator may be configured as a ring oscillator.

In some embodiments a fiber-laser based system may include an extra-cavity acousto-optic frequency shifter for carrier envelope phase control.

In some embodiments a fiber-laser based system may include an f-2f interferometer for carrier phase measurements.

In some embodiments an f-2f interferometer may be configured for carrier phase control of the oscillator.

In some embodiments a fiber-laser based system may include an intra-cavity electronically addressable optical component inserted into the intra-cavity beam path for carrier phase control.

In some embodiments an intra-cavity electronically addressable optical component may includes an acousto-optic modulator configured for intra-cavity loss and carrier phase control.

In some embodiments a fiber grating may be configured to compensate for the residual $3^{rd}$ order dispersion of the oscillator.

At least one embodiment includes an optical sub-surface micromachining apparatus having a fiber-laser based system generating pulses having pulse widths less than about 100 ps, in a wavelength range from about 1700 to 2500 nm.

In some embodiments a micromachining apparatus may be configured for machining of silicon.

At least one embodiment includes a fiber-laser based, chirped pulse amplification system (FCPA system). The system includes a passively mode locked fiber oscillator operating at or near a wavelength of 2000 nm. A pulse stretcher receives pulses from the passively mode locked fiber oscillator and produces stretched pulses. A fiber amplifier amplifies the stretched pulses and produces stretched and amplified pulses. The system includes a linear pulse compressor to compress the stretched and amplified pulses. A large mode area fiber is configured to nonlinearly compress the pulses output from the linear pulse compressor so as to further compress the pulses.

In some embodiments an FCPA system may include a stretcher fiber arrangement with overall positive dispersion and anomalous third order dispersion.

In some embodiments an FCPA system may include a pulse compressor having a least one of a bulk GRISM, prism, grating and glass plate.

In some embodiments an output of an FCPA system may pump an optical parametric oscillator, generator or amplifier In some embodiments an output of an FCPA system may be capable of generating self-frequency shifting in a nonlinear crystal or waveguide.

In some embodiments an optical modulator may be inserted upstream from a fiber amplifier to reduce the pulse repetition rate of the pulses being amplified in fiber amplifier(s) of an FCPA system.

At least one embodiment includes fiber-laser based system having negative dispersion gain fiber and positive dispersion undoped fiber. The core size of the gain fiber is larger than the core size of the undoped fiber. The system produces pulses with an approximately parabolic pulse spectrum.

At least one embodiment includes a fiber-laser based amplification system. The system includes: a passively mode locked fiber oscillator operating at or near a wavelength of 2000 nm. A pulse stretcher receives pulses from the passively mode locked fiber oscillator and produces stretched pulses. The pulse stretcher provides anomalous third order dispersion. The system includes a fiber amplifier amplifying the stretched pulses so as to produce stretched and amplified pulses at an output thereof.

In some embodiments an amplifier may be nonlinear and provide a value of self-phase modulation of at least 2.

In some embodiments the spectrum at the output of an amplifier is broadened due to the self-phase modulation.

In some embodiments the pulses at the output of an amplifier are nonlinearly compressed due to self-phase modulation.

In some embodiments a highly nonlinear fiber may be directly spliced to an output of an amplifier.

In some embodiments a fiber-based amplification system may include an undoped fiber directly spliced to the output of an amplifier.

At least one embodiment includes a fiber-laser based amplification system. The system includes a passively mode locked fiber oscillator operating at a wavelength at or near 2000 nm. A pulse stretcher receives pulses from the passively mode locked fiber oscillator and produces stretched pulses. A fiber amplifier amplifies the stretched pulses and produces recompressed and amplified pulses at an output thereof. The system includes a highly nonlinear fiber spliced directly to the output of the amplifier. The highly nonlinear fiber produces an optical continuum.

In some embodiments the fiber-based system includes an undoped fiber inserted upstream from a highly nonlinear fiber.

Thus, while only certain embodiments have been specifically described herein, it will be apparent that numerous modifications may be made thereto without departing from the spirit and scope of the invention. It is to be understood that the arrangements are not mutually exclusive. Elements may be combined among embodiments in suitable ways to accomplish desired design objectives. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A fiber-laser based, chirped pulse amplification system, comprising:
   a passively mode locked fiber oscillator operating at or near a wavelength of 2000 nm;
   a pulse stretcher receiving pulses from said passively mode locked fiber oscillator and producing stretched pulses;
   a fiber amplifier amplifying said stretched pulses and producing stretched and amplified pulses;
   a linear pulse compressor to compress said stretched and amplified pulses; and
   a large mode area fiber configured to nonlinearly compress the pulses output from the linear pulse compressor so as to further compress the pulses via Raman-soliton generation or higher order soliton compression.

2. The fiber-laser based, chirped pulse amplification system according to claim 1, further comprising a stretcher fiber arrangement with overall positive dispersion and anomalous third order dispersion at a wavelength of operation of said passively mode locked fiber oscillator.

3. The fiber-laser based, chirped pulse amplification system according to claim 1, further comprising a pulse compressor having a least one of a bulk GRISM, prism, grating and glass plate.

4. The fiber-laser based, chirped pulse amplification system according to claim 1, wherein an output of said system pumps an optical parametric oscillator, generator or amplifier.

5. The fiber-laser based, chirped pulse amplification system according to claim 1, wherein an output of said system is capable of generating self-frequency shifting in a nonlinear crystal or waveguide.

6. The fiber-laser based, chirped pulse amplification system according to claim 1, further comprising an optical modulator inserted upstream from said fiber amplifier to reduce the pulse repetition rate of the pulses being amplified in said fiber amplifier.

7. A-fiber-laser based amplification system, comprising:
   a passively mode locked fiber oscillator operating at or near a wavelength of 2000 nm;
   a fiber pulse stretcher receiving pulses from said passively mode locked fiber oscillator and producing stretched pulses, said fiber pulse stretcher providing anomalous third order dispersion in the wavelength operation range of said oscillator; and
   a fiber amplifier amplifying said stretched pulses and producing recompressed and amplified pulses at an output thereof,
   wherein second and third order dispersion of said fiber-based amplification system are at least partially compensated by said anomalous dispersion provided with said pulse stretcher.

8. A fiber-laser based amplification system according to claim 7, wherein said amplifier is nonlinear and provides a value of self-phase modulation of at least 2.

9. A fiber-laser based amplification system according to claim 8, wherein the spectrum at the output of said amplifier is broadened due to said self-phase modulation.

10. A fiber-laser based amplification system according to claim 8, wherein the pulses at the output of said amplifier are nonlinearly compressed due to said self-phase modulation.

11. A fiber-laser based amplification system, according to claim 7, further comprising a highly nonlinear fiber directly spliced to the output of said amplifier.

12. A fiber-laser based amplification system according to claim 11, further comprising an undoped fiber directly spliced to the output of said amplifier.

13. A fiber-laser based amplification system according to claim 7, further comprising an undoped fiber directly spliced to the output of said amplifier.

14. A fiber-laser based amplification system according to claim 13, wherein said undoped fiber is nonlinear and provides a value of self-phase modulation of at least 2.

15. A fiber-laser based amplification system, according to claim 7, wherein said fiber stretcher comprises a Germania doped fiber.

16. A fiber-laser based amplification system, according to claim 7, wherein said fiber stretcher comprises a fiber having a numerical aperture greater than about 0.25 and up to about 0.4.

17. A fiber-laser based amplification system, according to claim 7, wherein said fiber stretcher comprises a fiber having an air-hole formed in the fiber cladding.

18. A fiber-laser based amplification system, comprising:
   a passively mode locked fiber oscillator operating at a wavelength at or near 2000 nm;
   a fiber pulse stretcher receiving pulses from said passively mode locked fiber oscillator and producing stretched pulses, said fiber pulse stretcher providing anomalous third order dispersion in the wavelength operation range of said oscillator;
   a fiber amplifier amplifying said stretched pulses and producing recompressed and amplified pulses at an output thereof; and
   a highly nonlinear fiber spliced directly to the output of said amplifier, said highly nonlinear fiber producing an optical continuum.

19. A fiber-laser based amplification system according to claim 18, further comprising an undoped fiber inserted upstream of said highly nonlinear fiber.

\* \* \* \* \*